United States Patent [19]

Hoffman et al.

[11] Patent Number: 4,626,354
[45] Date of Patent: Dec. 2, 1986

[54] METHOD FOR ANAEROBIC TREATMENT OF HIGH STRENGTH LIQUORS

[75] Inventors: Clarence A. Hoffman, Rothschild; William M. Copa; Michael R. Mayer, both of Wausau, all of Wis.

[73] Assignee: Zimpro Inc., Rothschild, Wis.

[21] Appl. No.: 782,256

[22] Filed: Sep. 30, 1985

[51] Int. Cl.$^4$ .......................... C02F 3/28; C12P 5/02
[52] U.S. Cl. .................................. 210/603; 210/616; 210/618; 210/917; 210/631; 48/197 A; 435/167
[58] Field of Search ............... 210/603, 616, 618, 617, 210/605, 908, 909, 631, 917; 48/197 A, 111; 435/167

[56] References Cited

U.S. PATENT DOCUMENTS

| | | | |
|---|---|---|---|
| 2,059,286 | 11/1936 | Statham | 210/2 |
| 4,182,675 | 1/1980 | Jeris | 210/8 |
| 4,482,458 | 11/1984 | Rovel et al. | 210/603 |
| 4,505,819 | 3/1985 | Barnes et al. | 210/603 |

FOREIGN PATENT DOCUMENTS

| | | | |
|---|---|---|---|
| 53-62357 | 6/1978 | Japan . | |
| 58-196897 | 11/1983 | Japan | 210/603 |
| 58-196896 | 11/1983 | Japan | 210/603 |

OTHER PUBLICATIONS

Spencer, R. R. et al., "The Addition of Powdered Activated Carbon to Anaerobic Digesters—Effects on Methane Production", Battelle Laboratories Report No. BNWL-SA-5893, Jul. 1976.
Adams, Alan D., "Activated Carbon: Old Solution to Old Problem", *Water & Sewage Works,* Aug. 1975, pp. 46-48; and Sep. 1975, pp. 78-80.
Hunsicker, M. et al., "Powdered Activated Carbon Improves Anaerobic Digestion", *Water & Sewage Works,* pp. 62-63, Jul. 1976.
Carl M. Koch et al., "Wanted: More Gas, Less Sludge—Can PAC Help?", *Water and Wastes Engineering,* pp. 27-29, Jun. 1978.
DeBauche, J. Willard, Jr., "Research Report, Green Bay Metropolitan Sewerage District 1980-1982 Anaerobic Digestion of Heat Treatment Liquor", 1983.

*Primary Examiner*—Benoit Castel
*Attorney, Agent, or Firm*—Allen H. Erickson

[57] ABSTRACT

A process for treating high strength BOD containing liquors includes the step of mildly mixing and contacting the liquors with anaerobic bacteria and a powdered adsorbent support medium to remove a substantial portion of the organic matter and generate a methane fuel gas. Use of the powdered support medium at 0.1-20 g/l enables high removal of BOD in short treatment times, rapid clarification of treated liquors, and increased adsorbability of liquor color.

In a subsequent decolorizing embodiment, digested and clarified liquors are contacted with reduced concentrations of powdered color adsorbent to produce a treated liquor low in dissolved organic matter and color.

The spent streams of powdered adsorbent support medium-biomass and/or powdered color adsorbent are preferably regenerated and reused.

58 Claims, 5 Drawing Figures

FIG. 5

METHOD FOR ANAEROBIC TREATMENT OF HIGH STRENGTH LIQUORS

BACKGROUND OF THE INVENTION

1. Field of the Invention

This invention relates to an improvement in the treatment of high strength liquors and wastewaters by anaerobic digestion for the removal of organic matter and color.

2. Information Disclosure Statement

Anaerobic digestion of sewage sludges has been commonly practiced for many years. In this treatment process, organic matter in waste sludges is converted primarily to methane and carbon dioxide in an oxygen-free environment.

When compared to aerobic treatment processes, anaerobic digestion has several disadvantages. First, anaerobic digestion generally results in a considerably lower degree of organic matter removal. Secondly, the activity of anaerobic bacteria has proven to be very sensitive to pH, temperature, and toxic materials such as ammonia, pyridine, and heavy metals. The methanogenic bacteria reproduce at a low rate, so full recovery of a digester following an upset condition usually takes several weeks, and often several months.

From a theoretical standpoint, however, the anaerobic treatment process is more energy efficient than aerobic processes, since (a) transfer of large quantities of air or oxygen to the waste is not required, (b) a significant portion of the organic matter is converted to methane, a useful combustible fuel gas, and (c) anaerobic treatment results in a markedly lower production of new bacterial cells, biomass that must ultimately be disposed of.

Anaerobic treatment processes have required longer treatment residence times than aerobic processes. Anaerobic digestion of sewage sludges for 10–30 days is commonly practiced.

Thermal treatment of sludges, i.e., wet oxidation or "heat treatment", produces high strength liquors which are often highly colored. Neither aerobic or anaerobic treatment results in significant color removal from such high strength liquors; the color level may actually increase as a result of biological treatment.

Anaerobic digestion of sewage sludge with the addition of powdered activated carbon has been previously attempted. A paper by R. R. Spencer, A. J. Shukrow and J. F. Ferguson entitled "The Addition of Powdered Activated Carbon to Anaerobic Digesters: Effects on Methane Production", Battelle Laboratories Report No. BNWL-SA-5893, July, 1976 noted an improvement in gas production from the addition of carbon. However, destruction of sludge materials and production of gas were unacceptable at all but the highest carbon concentrations and longest residence times. At 2.5 days residence time, all tests were unacceptable.

Statham U.S. Pat. No. 2,059,286 discloses the use of small amounts (about 3–10 ppm) of activated carbon to sewage sludge undergoing anaerobic digestion. The patent claims that digestion time was thus reduced from six months to about three months.

Alan D. Adams, "Activated Carbon: Old Solution to Old Problem", Water & Sewage Works, August, 1975, pp 46–48; and September, 1975, pp 78–80, reported on crude initial tests by ICI America wherein activated carbon was added to anaerobic digesters. Mixed results were reported.

Addition of powdered activated carbon to an overloaded, poorly-operated two-stage digestion system was reported by M. Hunsicker et al., "Powdered Activated Carbon Improves Anaerobic Digestion", *Water and Sewage Works*, pp 62–63, July, 1976. Improvements in odor, sludge settling and gas production were noted.

Further tests were reported in Carl M. Koch et al., "Wanted: More Gas, Less Sludge—Can PAC Help?", *Water and Wastes Engineering*, pp. 27–29, June, 1978. The authors concluded that the use of activated carbon in sludge digesters does not enhance the digestion process unless the digesters are overloaded and operating poorly.

Anaerobic treatment of wastewater with a fluidized bed of particle support media (plastic, sand, coal, or activated carbon) in the size range of 0.2 to 0.3 mm was disclosed by Jeris, U.S. Pat. No. 4,182,675 and Barnes et al., U.S. Pat. No. 4,505,819. Wastewater feed $BOD_5$ ranged from 50 to 50,000 mg/l. Both inventions require substantial energy to suspend the relatively large particles in the fluidized bed. The anaerobic digester of Rovel et al., U.S. Pat. No. 4,482,458 contains similar granular support media of less than 1 mm size. Recirculation of digester contents is accomplished by pressurizing the methane-$CO_2$ biogas to a high overpressure and injecting the gas into a draft tube within the digester. This also requires considerable energy.

In Japanese Patent Publication No. 62,357/78, published June 3, 1978, of Niigata Engineering Co., Ltd., high-strength wastewater is diluted, mixed with activated carbon and passed through four biological stages comprising (a) anaerobic denitrification, (b) aerobic nitrification and organic carbon removal, (c) a second anaerobic denitrification and (d) a final aerobic treatment step. Fuel gas is not produced because virtually no organic matter destruction occurs in the anaerobic denitrification stages.

J. Willard DeBauche, Jr., "Research Report, Green Bay Metropolitan Sewerage District 1980–82 Anaerobic Digestion of Heat Treatment Liquor" described an anaerobic contact suspended growth system operating without added activated carbon but with 2.56 g/l total suspended solids comprised solely of biomass. The reported reduction in liquor $BOD_5$ was 56 percent.

SUMMARY OF THE INVENTION

In contrast to the teaching of the prior art, it has now been found possible to anaerobically treat high-strength liquors containing little or no suspended matter to remove, in short treatment times, the bulk of the organic matter.

The invention comprises a process for treatment of high strength BOD containing liquors, comprising the steps of:

(a) mixing and contacting the high strength liquors with biomass comprising viable facultative acid-forming bacteria and methanogenic bacteria, together with a powdered adsorbent support medium, for a period of 4–72 hours in a mildly mixed anaerobic digestion environment to remove a substantial portion of the BOD and generate a methane fuel gas and additional facultative acid-forming bacteria and methanogenic bacteria;

(b) separating and recovering the methane fuel gas from the mixture of digested liquors, biomass and adsorbent support medium;

(c) separating the biomass and adsorbent support medium from the digested liquors by gravitational force to form a clarified digested liquor and a sludge of biomass and adsorbent support medium;

(d) discharging the clarified digested liquor to the natural environment or to a further step of reuse or treatment;

(e) continuously or intermittently recycling a portion or all of the sludge formed in step (c) to the mixing and contact step (a) in order to treat additional quantities of high strength BOD containing liquor; and (f) intermittently or continuously adding fresh powdered adsorbent support medium to the mixture of liquors, biomass and support medium in step (a) to compensate for losses of support medium in the process.

Furthermore, it has been discovered that the color in high strength liquor treated by the aforesaid process is much more amenable to simple adsorption on activated carbon. An embodiment of the invention encompasses the enhanced removal of both organic matter and color from high strength liquors by anaerobic treatment according to the above steps (a) through (f), followed by the steps of:

(g) contacting the clarified digested liquor from step (d) with a color adsorbent to remove color from the liquor;

(h) separating the spent color adsorbent from the decolorized clarifier liquor; and (i) discharging the decolorized clarified liquor from step (h) to the natural environment or to a further step of reuse or treatment.

Either or both of the powdered adsorbent support medium and color adsorbent may be regenerated and re-used in the process to treat further portions of liquor.

DESCRIPTION OF THE PREFERRED EMBODIMENTS

This invention is a new method for treating high strength liquors, i.e., wastewaters containing high concentrations of dissolved organic matter and low concentrations of suspended solids. Such liquors are often highly colored. This invention is applicable to liquors containing 500 to 100,000 mg/l 5-day biochemical oxygen demand, denoted as $BOD_5$ or more simply BOD in this application. Where the liquor is not readily biodegradable, resulting in a low BOD measurement, chemical oxygen demand (COD) may be a better measure of liquor strength. As used herein, high strength liquors containing 700 to 160,000 mg/l COD are considered to be equivalent to high strength BOD containing liquors.

In contrast to prior art processes, this invention does not require prior dilution of the liquor to achieve a lower initial BOD or COD concentration. However, it is conceivable that certain high strength liquors may require dilution to reduce viscosity, for example, to enable proper flow, mixing and contact in this invention.

Anaerobic digestion of high strength liquors containing little or no suspended solids presents particular problems. Methanogenic bacteria are not only slow to reproduce, but they are difficult to separate from the treated liquor by commonly used separation methods. Thus, treated liquors may carry the needed bacteria out of the system, severely hampering its operation. A high BOD removal from high strength liquors is difficult to achieve and maintain in a conventionally operated anaerobic digester.

Figure 1:
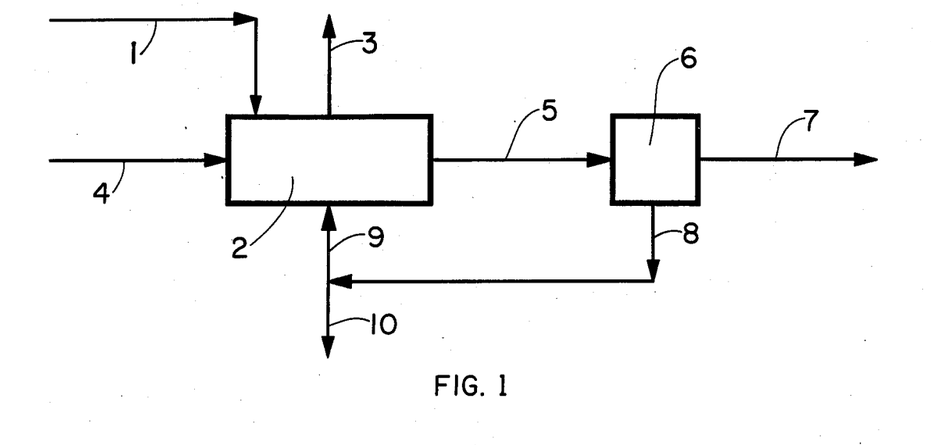
FIG. 1 is a process flowsheet showing the steps of the present invention.

In contrast to such prior disappointments, the present invention has demonstrated high BOD removals at short residence times. The digestion time is 4–72 hours, and preferably between 4 and 48 hours. This invention encompasses the removal of at least 50 percent of the high strength liquor BOD. The preferred BOD removal exceeds 80 percent, and the most preferred BOD removal exceeds 90 percent. The degree of organic matter removal from a liquor whether measured as BOD, COD, DOC, or another analytical means, is a function of loading rate, concentration of powdered adsorbent support medium, and other factors. The preferred loading rate to digester 2 is 0.1–4.5 kg BOD per kg biomass per day. When the measured component is COD, rather than BOD, the preferred loading rate is 0.1–11.0 kg. COD per kg. biomass per day.

The powdered adsorbent support medium used in this invention is a material capable of adsorbing dissolved material from aqueous solutions. It also serves as a support medium to which methanogenic and facultative acid-forming bacteria inherent to the process become physically attached. Typical powdered adsorbent support medium materials are fly ash, fuller's earth, diatomaceous earth, polymeric material and charcoal. Powdered activated carbon is a preferred material because of its high adsorptive capacity and for other reasons noted herein.

The powdered adsorbent support medium is also an agglomeration and weighting agent, enabling the mixture of bacteria, support medium and other suspended solids present in liquor 1 to be cleanly separated from the anaerobically digested liquor by gravitational force, e.g., settling or centrifugation.

We refer now to FIG. 1 of the drawings, which shows the steps of this invention. High strength BOD containing liquors 1 are introduced into an anaerobic digestion atmosphere within anaerobic digester 2. Fresh powdered adsorbent support medium 4 is initially added to the high strength liquors in digester 2 to achieve the desired adsorbent support medium concentration. Further adsorbent support medium 4 is subsequently added continuously or intermittently as needed to maintain the desired concentration, i.e., to compensate for adsorbent support medium losses in the process. It is understood that said support medium may be added to incoming liquor 1 or other stream passing to digester 2.

The digester 2 is initially "seeded", for example with anaerobically digested or fresh sewage, sewage sludge or high strength liquors to supply the facultative acid-forming bacteria and methanogenic bacteria. Alternatively, the bacteria comprising the biomass may be provided by inoculation with cultures specially prepared for this purpose. Some of the bacteria become attached to the powdered adsorbent support medium, while others remain free-floating.

The high-strength liquors 1 are continuously mixed and contacted with the biomass and support medium in anaerobic digester 2 for a period of 4 to 72 hours, depending upon the BOD or COD concentration in liquor 1 and the degree of treatment desired. The relatively mild mixing is preferably accomplished by recirculating produced gases and/or digester contents, using a compressor or pump, respectively.

Following anaerobic digestion of liquor 1 in digester 2, the mixture 5 of treated liquor, biomass and adsorbent support medium is directed to a separation step 6, where the suspended solids comprising a mixture of biomass and adsorbent support medium are separated from the liquor by gravitational force to form a clarified liquor 7 and a sludge 8 of biomass and support medium. Clarified digested liquor 7 is discharged to the environment or to a further step of reuse or treatment. For example, it may be desirable to further treat the clarified liquor to remove nitrogen, color, and/or small quantities of finely divided solids which may be present.

Figure 2:
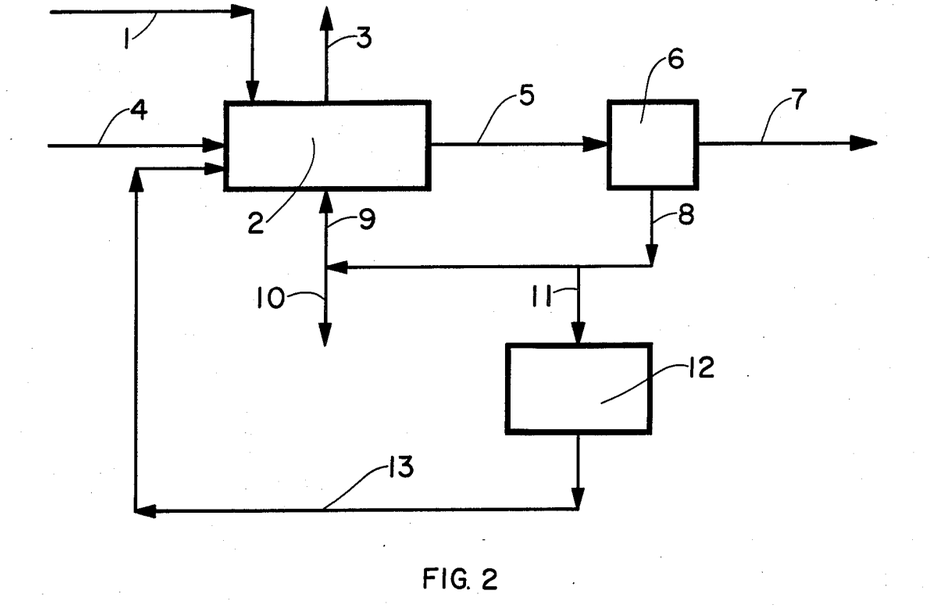
FIG. 2 is a flowsheet showing the incorporation of adsorbent regeneration in the process of the invention.
Figure 4:
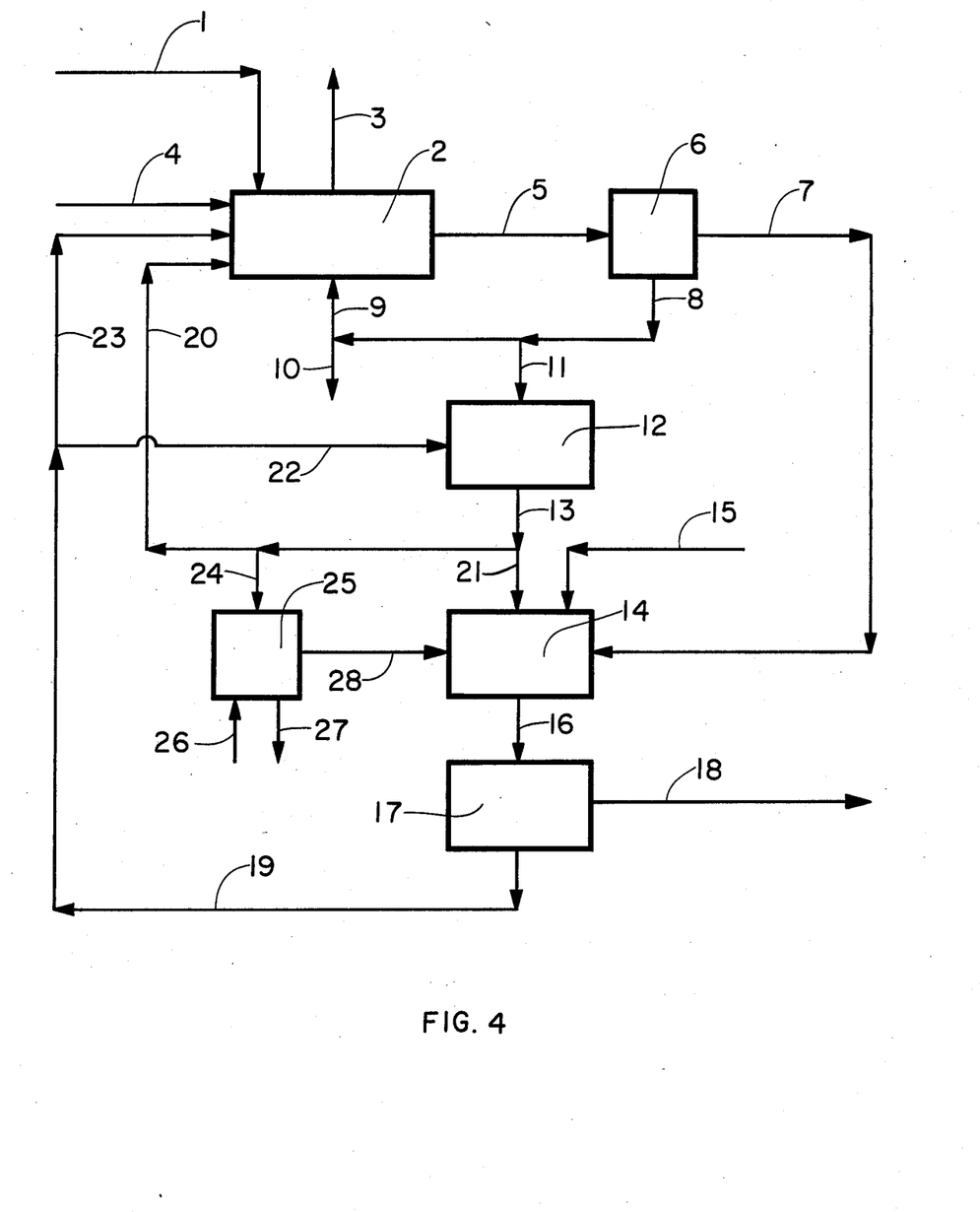
FIG. 4 is a flowsheet showing a preferred embodiment of the invention.
Figure 5:
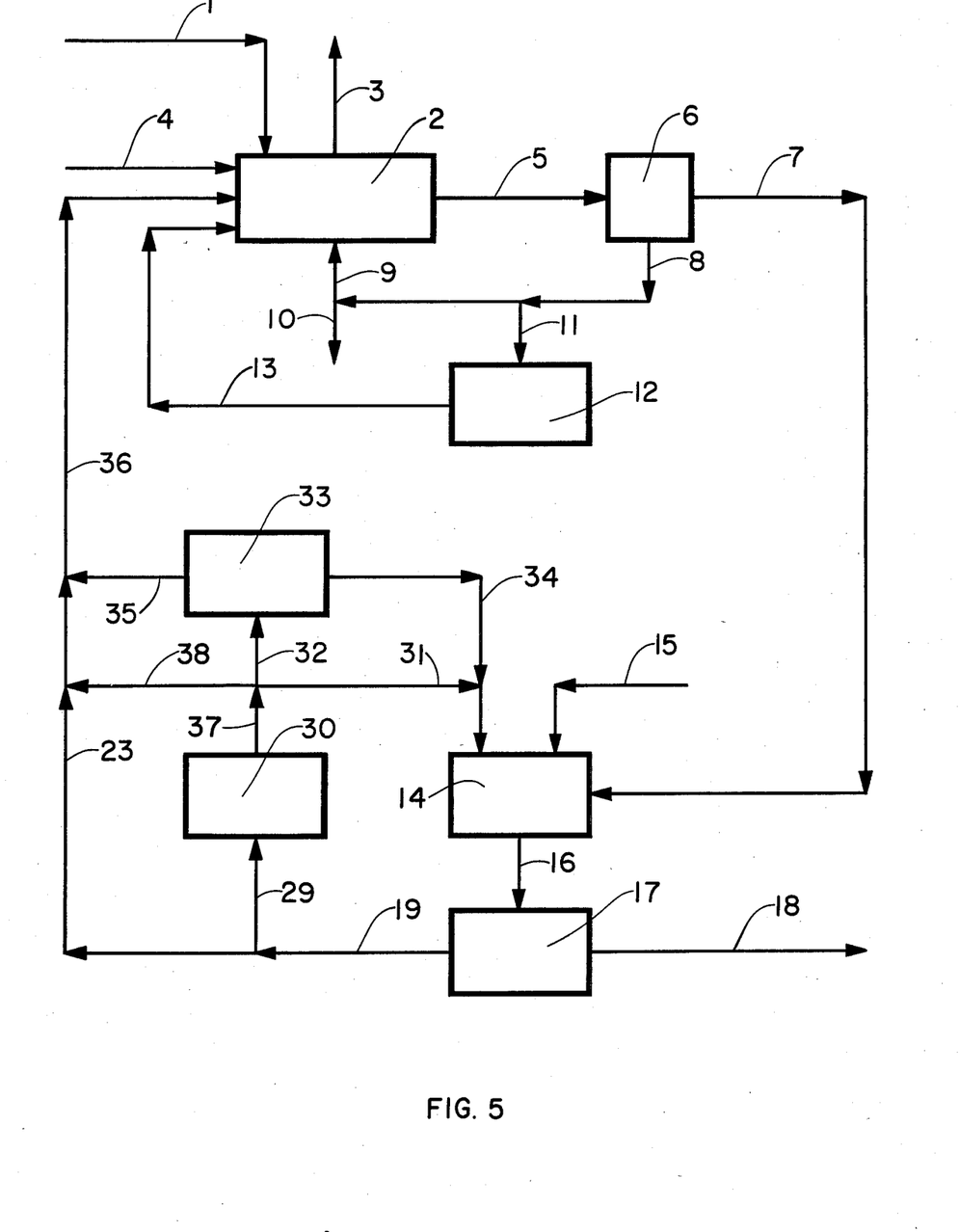
FIG. 5 is a flowsheet showing a further preferred embodiment of the invention.

A portion 9 or all of sludge 8 comprising biomass and adsorbent support medium is continuously or intermittently recycled to the mixing and contact step in digester 2 to treat additional quantities of liquor 1. When the invention is operated under steady state conditions, a quantity of sludge is recycled to maintain a relatively constant biomass concentration in digester 2. The small remaining fraction 10 of sludge 8 may be regenerated, as illustrated in FIGS. 2, 4 and 5, or treated further, e.g., incinerated, or discharged to the environment for final disposal. The particular method of handling the excess sludge 10 depends upon the quantity of sludge to be handled, cost of fresh adsorbent support medium, expense of regeneration and cost of alternate disposal means.

As already indicated, additional powdered adsorbent support medium 4 is provided to offset losses of support medium in the process and maintain the desired concentration in digester 2.

As already indicated, this invention requires use of a powdered adsorbent material as the support medium. At least 25 percent of the support medium comprises powder-sized particles of 0.01 to 0.3 mm diameter. Preferably, at least 25 percent of adsorbent material 4 is of 0.01–0.2 mm diameter. The use of more coarse materials, commonly termed granular adsorbents, is unsatisfactory, because (a) larger sized materials have a much lower surface area per unit weight, and (b) larger particles settle much more rapidly, requiring increased energy expenditures to keep the particles suspended. The smaller particle size results in greater surface area for adsorption of liquor constituents and for attachment of the biomass. Over extended periods of time, attrition of the particles gradually results in an increased number of particles less than 0.01 mm diameter. These smaller particles are not deleterious as long as the required fraction of 0.01–0.3 mm particles is present.

Fuel gas 3 containing primarily methane and carbon dioxide is generated through breakdown of organic matter contained in the liquor, by action of the facultative acid-forming bacteria and methanogenic bacteria. This gas mixture is separated from the mixture of liquor, biomass and adsorbent support medium within the anaerobic digester. The fuel gas mixture 3 is discharged from the anaerobic digestion step and recovered for use or disposal.

Like other anaerobic treatment processes, this invention operates best at a digester temperature between 25° and 50° C., and most optimally at a temperature of about 35° C. The temperature can be regulated by conventional digester heaters. When the liquors to be treated are generated from a heated process, e.g., a wet oxidation or thermal conditioning system, the outlet liquor temperature is often controlled at a somewhat elevated level. Such liquors may supply part or all of the thermal energy required to maintain the desired digester temperature, reducing or eliminating the need for an external heat source. Alternately, the liquors may be heated by indirect heat exchange with hot sewage sludge or industrial waste which has undergone wet oxidation or thermal conditioning.

The embodiment shown in FIG. 2 includes treatment of the biomass—support medium sludge 8 to destroy the biomass and regenerate the adsorbance properties of the support medium.

In FIG. 2, high-strength BOD containing liquors 1 are mixed and contacted with biomass and powdered adsorbent support medium 4 for 4–72 hours in an anaerobic digester, as previously shown in FIG. 1. Fuel gas 3 is separated and recovered from the mixture of liquor, biomass and adsorbent support medium in digester 2. The latter mixture 5 passes to separation step 6, where the suspended solids are separated from the liquor by gravitational force, forming a clarified digested liquor and a sludge of biomass and support medium. Clarified digested liquor 7 is discharged to the environment or to a further step of reuse or treatment.

A portion 9 of sludge 8 comprising biomass and adsorbent support medium is continuously or intermittently recycled to the mixing and contact step in digester 2 to treat additional high strength liquor 1.

Another portion 11 of sludge 8 is directed to regeneration process 12 in which biomass in the sludge is destroyed and adsorbent support medium is regenerated. The regenerated adsorbent support medium 13 is returned to digester 2 to be mixed with and contact additional quantities of liquor. Thus, support medium in digester 2 comes from three sources during continuous operation:

(a) fresh support medium 4 to compensate for losses in the process;

(b) recycled biomass—support medium mixture 9; and (c) regenerated support medium 13.

Regeneration process 12 may be a controlled-atmosphere furnace combustion, wet oxidation, or other process which will destroy the biomass and regenerate the adsorptive property of the support medium.

In some cases an accumulation of inert ash in sludge 8 requires that a fraction of the sludge be discharged from the process as stream 10 for disposal.

Figure 3:
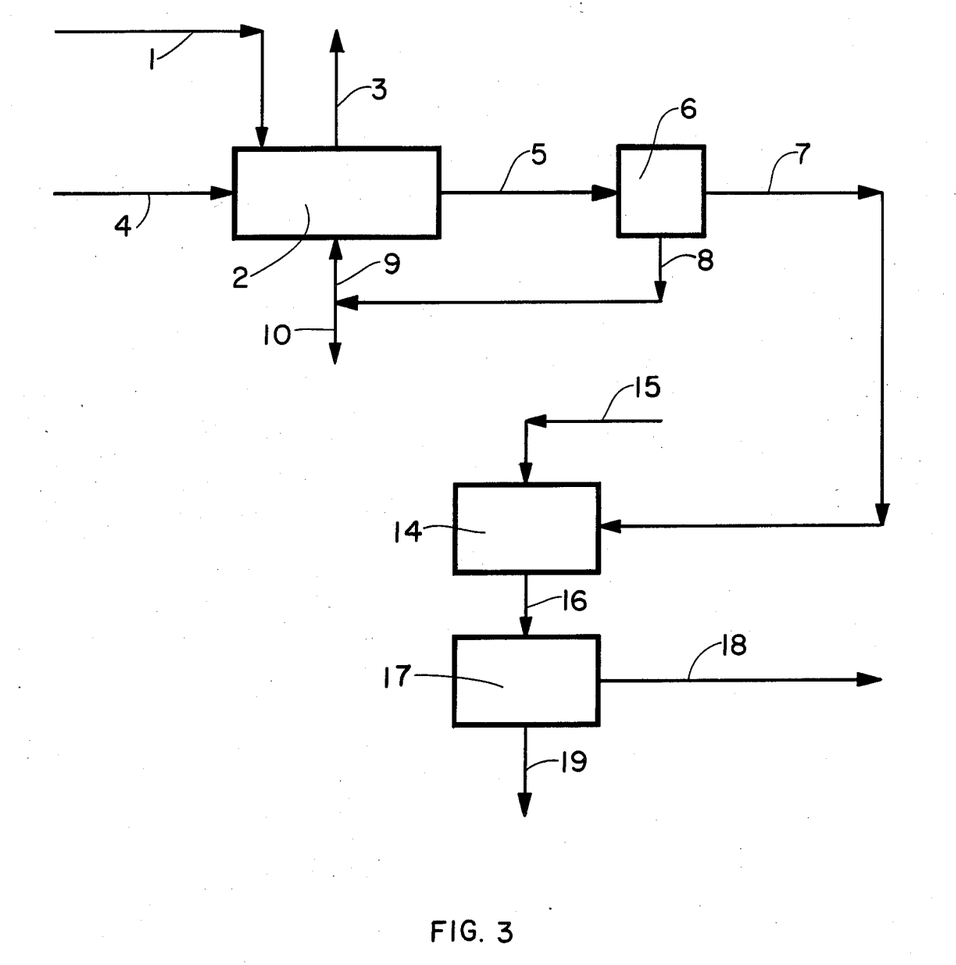
FIG. 3 is a flowsheet of the invention incorporating steps for removal of both organic matter and color.

FIG. 3 illustrates an embodiment of the invention which is particularly advantageous for treating high strength liquors which are colored. Soluble color matter is usually present in such liquors, often in concentrations which produce color analyses of several thousand APHA (American Public Health Association) units. For example, thermal conditioning or wet oxidation of municipal sewage sludges or industrial wastes at some conditions results in liquor color values of 5000–20,000 APHA units. The color of such high strength liquors, as a rule, is not significantly reduced by aerobic processes (e.g., activated sludge) or anaerobic processes. Such biological treatment may even increase the color value.

Because of its persistence in the natural environment, color is generally objectionable in any wastewater discharged to the environment, e.g., river or ocean. State regulations limiting the color of discharged wastewaters often cannot be met by merely diluting high strength color liquors with treated sewage. The liquors require treatment to remove color as well as dissolved organic matter contained therein, before the liquors may be discharged.

Quite unexpectedly, we have now discovered that anaerobic treatment of high strength liquor with powdered adsorbent support medium results in much increased color removal in a subsequent adsorption step. This is true even when the anaerobic digestion step increases the color value of the liquor. The adsorption step also removes a considerable quantity of remaining organic matter in the liquor.

The first steps of this embodiment are identical to the steps of FIG. 1, already described. In FIG. 3, high strength BOD containing colored liquors 1 are mixed and contacted with biomass and powdered adsorbent support medium 4 in an anaerobic digester 2 for a period of 4-72 hours. The environment within digester 2 is maintained in an anaerobic state. The biomass comprises a mixture of viable facultative acid-forming bacteria and methanogenic bacteria, both common to well-operated anaerobic digestion systems. A substantial portion of the BOD is removed by the anaerobic digestion, and partially converted to fuel gas 3.

The mixture 5 of treated liquor, biomass and support medium from digester 2 is directed to a separation step 6 where the suspended solids are separated from the liquor to form a clarified digested liquor 7 and a sludge 8. A portion 9 of sludge 8 is recycled to digester 2, while the remaining fraction 10 may be regenerated, incinerated or discharged to the natural environment for final disposal.

Thus far, the steps described are identical to those of FIG. 1. In the remaining steps of this embodiment, clarified liquor 7 is decolorized by contact with color adsorbent 15. Although the decolorization step may comprise passage through a bed or filter of fixed adsorbent particles, the preferred process comprises contacting the clarified liquor 7 with color adsorbent 15 in a contact step 14 to remove color, directing adsorbent—liquor mixture 16 to separator 17, and separating spent color adsorbent 19 from the decolorized clarified liquor 18. The color adsorbent not only removes color but also removes organic matter, measured as COD, BOD and/or DOC. The clarified liquor 18 containing only a small fraction of its original BOD, COD, DOC and color, is discharged to the natural environment or to a further step of reuse or treatment e.g. nitrogen removal.

Separation 17 may be a gravity settling vessel, centrifuge, filter or other device for separating the color adsorbent from the decolorized liquor.

Examples of color adsorbents which may be used are fly ash, fuller's earth, diatomaceous earth, polymeric material, charcoal and activated carbon. The preferred material is activated carbon. The color adsorbent 15 need not be the same material as powdered adsorbent support medium 4. However, as shown in FIGS. 4 and 5, there are advantages in using the same material. When adsorbent 15 is a different material than support medium 4, the optimum regeneration conditions, or even the method, may differ for each material. Thus, if a single regeneration is used, certain compromises are required, and some advantages of the process may be lost. In the preferred process, a single adsorbent material is used for both the digestion and decolorization steps. Most preferably, powdered activated carbon is used for both steps. Thus, powdered activated carbon is used as the powdered adsorbent support medium 4, and additional portions of powdered activated carbon are used as the color adsorbent. However, different adsorbents, each requiring its own regeneration, may sometimes be used to advantage.

The preferred particle size is between 0.01 and about 0.3 mm diameter to provide an optimal balance between adsorption surface area and ease of separation from the decolorized liquors. Preferably, at least 25 percent of the color adsorbent in the decolorization step is 0.01-0.3 mm diameter. The dosage of color adsorbent to the liquors varies from 0.1 to 20 g/l, depending on the type and strength of liquor, the desired degree of color removal and activity of the adsorbent.

Although the contact time between liquor and color adsorbent may vary from a few minutes to several days, the optimum contact time is 0.2 to 4 hours to maximize adsorption and minimize possible desorption.

The embodiments illustrated in FIGS. 4 and 5 introduce additional steps which enhance the overall removal of organic matter and color from high strength liquors while reducing adsorbent expense.

In FIG. 4, elements 1 through 19, and limitations thereof, are as previously described in FIGS. 1, 2 and 3. A portion 11 of sludge 8 is directed to regeneration process 12 in which biomass is destroyed and adsorbent support medium is regenerated. A portion 20 or all of regenerated support medium 13 is directed to digester 2 to treat additional quantities of high strength liquor 1. Optionally, spent color adsorbent 19 is also directed as stream 23 to digester 2 where it supplies additional surface area for attachment of bacteria and adsorption of BOD-producing materials. Spent color adsorbent provides approximately the same surface area as fresh adsorbent for biomass attachment, because color is nearly completed adsorbed in tiny pores. These pores are too small for passage of bacterial cells into the adsorbent.

In some cases, recycle of spent color adsorbent to digester 2 may fully replace the need for fresh adsorbent support medium 4. All fresh adsorbent will then be added as stream 15 to the color adsorption step 14.

A portion 21 of regenerated support medium 13 may alternatively be directed to decolorization contact step 14 to act as a color adsorbent. Thus, a portion of adsorbent 15 is replaced by the regenerated support medium.

When regenerated under some conditions, the adsorbent stream 13 may contain colored matter. For example, regeneration of sludges containing adsorbent and biomass may be accomplished by the well-known wet air oxidation process. When the regeneration process is operated to yield a less-than-complete regeneration of the adsorbent, the resulting water phase contains color which is not readily adsorbable, but can be made so by the anaerobic treatment of this invention. This color results from incomplete combustion of the biomass associated with the adsorbent. In such cases, regenerated adsorbent 24 may be washed with water 26 to remove color in washing step 25 before addition as stream 28 to contact step 14. The small stream of used color containing wash water 27 is preferably recycled to digester 2 to undergo anaerobic conversion of the color to a more adsorbable form.

In a further alternate embodiment, a portion 22 of spent color adsorbent 19 is directed to regeneration step 12 to be regenerated together with sludge 11. A portion 20 of all of regenerated material 13 is recycled to digester 2. Optionally, a portion 21 or 28 may also be directed to contact step 14 as already described.

Spent color adsorbent 19 differs from sludge 8 in that it has very little associated biomass, only that which carries over from separation step 6 and passes through decolorization step 14. Thus, the concentration of organic matter associated with spent adsorbent 19 is very small compared to that of sludge 8. Decolorization step 14 is one of adsorption, while anaerobic contact step in digester 2 is biological or biochemical in nature.

Decolorization step 14 removes preferably in excess of 50 percent of the color in liquor 7. More preferably, in excess of 80 percent, and most preferably, in excess of 90 percent of the color is removed. The step also removes a considerable portion of the BOD, COD and DOC remaining after the anaerobic digestion step.

The embodiment of FIG. 5 incorporates the anaerobic digestion step and decolorizing step of FIG. 3, together with separate regeneration steps 12 and 30, respectively for each of sludge 11 and spent color adsorbent 19. Elements 1 through 19 are as previously described. A portion 11 of sludge 8 from anaerobic digestion of high strength liquor 1 is regenerated and recycled to digester 2 as stream 13. A portion or all of spent color adsorbent 19 is directed to regeneration step 30, where contaminants including color, organic matter and microorganisms are removed from the adsorbent surface and the adsorbency is renewed. Regenerated adsorbent 37 is recycled to decolorization step 14 as stream 31 to adsorb color and organic matter from further portions of clarified liquor 7.

The regeneration step 30 may be any process which accomplishes the desired rejuvenation of the adsorbent, and may differ from regeneration step 12 because the functions of support medium 4 and color adsorbent 15 differ. The optimum conditions for the two regeneration steps may differ even when support medium 4 and adsorbent 15 are the same material, e.g., the same grade of powdered activated carbon.

With some types and conditions of regeneration 30, a small amount of soluble color may be produced. Optionally, a portion 32 of regenerated color adsorbent 37 may be directed to a washing step 33 before recycling to decolorization step 14 as stream 34. The wash water 35 containing the color is then passed as stream 36 to digester 2 where the color is anaerobically treated to increase its adsorbability.

In an optional embodiment, a portion 23 of spent color adsorbent 19 may be recycled to digester 2 for treatment of additional liquor 1 quantities. In a further embodiment, a portion 38 of regenerated color adsorbent 37 is directed to digester 2 for treatment of incoming high strength liquor 1.

The internal operation of digester 2 differs from that used in fluidized beds or expanded beds of the prior art.

Fluidized beds utilize relatively large size particles of uniform size and shape so that a uniform settling rate results. An upward flow of liquid, uniform in velocity over the cross-section of the apparatus, is established to equal the downward velocity of the solid particles. At the upper end of the apparatus, an enlarged portion results in reduced liquid velocity for clarification. Thus, the solids particles do not leave the fluidized bed. Introduction of gas into the fluidized bed produces vertical mixing from bottom to top, and solids particles overflow with the liquid. Also, it is often necessary to recycle clarified liquid from the top of the apparatus to the distributor at the bottom to achieve the required upward velocity.

The term "expanded bed" has been applied to fluidized beds, but is generally limited to beds which expand upward from the quiescent state as the upward liquid velocity increases, but are operated so that little mixing of solids occurs within the bed. The upward liquid velocity is maintained uniformly over the bed cross-section.

Fluidized beds and expanded beds require considerable energy to keep the large particles in suspension. In contrast to such systems, the present invention, using small powder particles, requires little energy for mixing. It has been found that simple recycle of a small stream of liquor solids from the bottom of the digester to the upper portion of the digester is sufficient to create the mild mixing. Alternatively, a small stream of fuel gas produced in the digester may be circulated to the lower portion of the digester.

In all of the embodiments described, the process may be operated batch-wise. However, the preferred mode of operation is as a semi-continuous or continuous process. For purposes of this application, a continuous operation is defined as one in which the stream of liquor through the system is continuous, even though one or more streams of adsorbent, sludge, or other material may be intermittent. A semi-continuous process is one in which the flow of liquor itself through the system is semi-continuous in nature. Thus, for example, where a high strength BOD containing liquor may be produced intermittently, the preferred mode of operation may be semi-continuous.

EXAMPLES

The following examples will further illustrate the invention without limiting the scope thereof.

EXAMPLE 1

A mixture of primary and activated sludge from a municipal wastewater treatment plant was subjected to wet air oxidation at 177° C. and 21.1 kg/cm$^2$ pressure for a period of 72 minutes in which 5% of the organic matter was oxidized. After allowing the mixture to cool and settle for 4 hours, the supernatant was separated. The thickened settled solids were filtered. The supernatant and filtrate were combined to give a high strength BOD containing liquor visually free of suspended solids and having the following analyses:

Biochemical Oxygen Demand (BOD$_5$) 4087 mg/l
Chemical Oxygen Demand (COD) 10,400 mg/l
Color 7540 APHA units All analyses in these examples were conducted according to Standard Methods, a publication of the American Public Health Association (15th Edition, 1980). These analyses included biochemical oxygen demand (BOD$_5$), chemical oxygen demand (COD), dissolved organic carbon (DOC) and color (Amer. Public Health Assn. units or APHA units).

The liquor was fed continuously to an anaerobic digestion vessel maintained at a temperature of 35° C. Liquor residence time in the digester was 24 hours. Continuous recirculation and mild mixing of the digester contents was accomplished by pumping the mixed liquor of support medium, biomass and liquor from the bottom of the digester to an inlet just below the liquid surface. The digester and subsequent settling vessel clarifier were connected at mid-depth allowing the contents of the digester to flow into the clarifier. Suspended solids which settled in the clarifier were periodically pumped back to the digester while the clarified liquor was collected for sampling and/or further treatment.

The digester was previously seeded with actively digesting sludge acclimated to the liquor. A powdered adsorbent support medium was added to the digester at a concentration of 6900 mg/l. The support medium was powdered activated carbon of which at least 60 percent was −325 mesh (0.0017 inches diameter or 0.044 mm diameter). The specific surface area of the carbon was 475 m$^2$/g. By removing a portion of the mixed liquor daily, the digester biomass concentration was maintained at 8300 mg/l. Activated carbon was added daily to replace the removed activated carbon. The digester loading rate was 0.49 kilogram BOD$_5$ per day per kilogram of mixed liquor biomass.

Fuel gas which analyzed 65% methane and 32% carbon dioxide was generated in the digester at the rate of 430 liters (S.T.P.) per kilogram of COD removed. The analyses of the treated liquors were:

BOD$_5$ 194 mg/l
COD 2470 mg/l
Color 5780 APHA units

The reduction in liquor BOD$_5$ was 95.3%, in COD 76.2% and in color 23.3%. Biological sludge (biomass) was produced at the rate of 0.05 kilogram per kilogram of BOD$_5$ removed from the liquors.

EXAMPLE II

A mixture of primary and activated sludge from a municipal wastewater treatment installation was subjected to wet air oxidation at 205° C. and 28.1 kg/cm$^2$ pressure for a period of 15 minutes in which 9% of the organic matter was oxidized. After allowing the mixture to cool and settle for 24 hours, the supernatant, a high strength BOD containing liquor, virtually free of suspended solids, was separated. The liquor analyses were determined as follows.

BOD$_5$ 6050 mg/l
COD 19,300 mg/l
Color 18400 APHA units

The liquor was fed continuously at a controlled rate to a digestion vessel maintained at a temperature of 35° C. Liquor residence time in the digestor was 47 hours. Continuous recirculation and mild mixing of the digester contents was accomplished by pumping the mixed liquor of biomass, support medium and liquor from the bottom of the digester to an inlet just below the liquid surface. The digester and settling vessel clarifier were connected at mid-depth allowing the contents of the digester to flow into the clarifier. Suspended solids which settled in the clarifier were periodically pumped back to the digester while the clarified liquor was collected for sampling and/or further treatment.

The digester was previously seeded with actively digesting sludge acclimated to the liquor. Activated carbon as in Example I was added to the digester at a concentration of 4000 milligrams per liter of mixed liquor. By removing a portion of the mixed liquor daily, the digester biomass concentration was maintained at 10800 milligrams per liter. Activated carbon was added daily to replace the removed activated carbon. The digester loading rate was 0.29 kilograms BOD$_5$ per day per kilogram of mixed liquor biomass.

Fuel gas which analyzed 65% methane and 31% carbon dioxide was generated in the digester at the rate of 370 liters (S.T.P.) per kilogram of COD removed. The analyses of the treated liquors were:

BOD$_5$ 907 mg/l
COD 7730 mg/l
Color 19400 APHA units

Liquor BOD$_5$ was reduced by 85.0%, COD was reduced 60.1%, and color was increased 5%. Biological sludge was produced at the rate of 0.07 kilogram biomass per kilogram of BOD removed from the liquors.

EXAMPLE III

A mixture of primary and activated sludge from a municipal wastewater treatment plant was subjected to heat treatment (no oxidation) at 210° C. and 21.1 kg/cm$^2$ pressure for a period of 30 minutes. After allowing the mixture to cool and settle for 24 hours, the supernatant was separated. The thickened solids were filtered. The supernatant and filtrate were combined to give a high strength BOD containing liquor which was visually free of suspended solids and had the following analyses:

BOD$_5$ 5440 mg/l
COD 12,700 mg/l
Color 4890 APHA units

The liquor was fed continuously to a digestion vessel maintained at a temperature of 35° C. Liquid residence time in the digester was 23 hours.

The digester was previously seeded with actively digesting sludge acclimated to the liquor. Activated carbon as in prior examples was added to the digester at a concentration of 1900 milligrams per liter of mixed liquor. By removing a portion of the mixed liquor daily, the digester biomass concentration was maintained at 7300 mg/l. Activated carbon was added daily to replace the removed activated carbon. The digester loading rate was 0.78 kilogram BOD$_5$ per kilogram of biomass per day.

Fuel gas which analyzed 74% methane and 23% carbon dioxide was generated in the digester at the rate of 370 liters per kilogram of COD removed. The analyses of the treated liquors were:

BOD$_5$ 231 mg/l
COD 2700 mg/l
Color 4300 APHA units

The reduction in liquor BOD$_5$ was 96.4%, in COD 78.8% and in color 12.1%. Biological sludge was produced at the rate of 0.013 kilogram biomass per kilogram of BOD$_5$ removed.

EXAMPLE IV

The anaerobically digested thermal conditioning liquor obtained by the treatment described in Example II, having 19,400 APHA units, was contacted with 12.4 g/l activated carbon for a period of 2 hours. After separation of the carbon, the color of the liquor was determined to be 1590 APHA units, indicating 91.8 percent removal. A portion of the non-digested liquor used in Example II, having 18,400 APHA units, was contacted with 12.4 g/l powdered activated carbon. Separation of the activated carbon yielded a liquor with a color of 8500 APHA units, indicating 53.8 percent removal of color. The overall removals of COD, dissolved organic carbon (DOC) and color from the high strength liquor were:

|  | High Strength Liquor | Digestion Plus Adsorption | Adsorption Only |
|---|---|---|---|
| COD, mg/l | 19,300 | 2490 | 11,800 |
| % COD Removal | — | 87.1 | 38.9 |
| DOC, mg/l | — | 537 | 4130 |
| Color, APHA units | 18,400 | 1590 | 8500 |
| % Color Removal | — | 91.4 | 53.8 |
| Color Removed per Gram of Carbon | — | 1436 | 798 |

In this example, the anaerobic digestion step of this invention actually increased the color value of the liquor. Nevertheless, the digestion step resulted in increased efficiency of color adsorption in the subsequent decolorization step. The units of color removed per gram of activated carbon adsorbent was almost doubled, when compared to simple adsorption of the high strength liquor.

EXAMPLE V

The anaerobically digested thermal conditioning liquor obtained by the treatment described in Example III, containing 4300 APHA units, was contacted with 6.4 g/l activated carbon for a period of 2 hours. After separation of the activated carbon, the color of the liquor was determined as 320 APHA units, providing 92.6 percent removal of color. A portion of the nondigested thermally conditioned liquor, having 4890 APHA units was contacted with 6.4 g/l powdered activated carbon for a period of 2 hours. After separation of the activated carbon, the color of the treated liquor was determined as 1910 APHA units, for 60.9 percent removal of color. The overall removals of COD, DOC and color from the high strength liquor were as follows:

|  | High Strength Liquor | Digestion Plus Adsorption | Adsorption Only |
|---|---|---|---|
| COD, mg/l | 12,700 | 578 | 9280 |
| % COD Removal | — | 95.4 | 26.9 |
| DOC, mg/l | — | 201 | 2520 |
| Color, APHA Units | 4890 | 320 | 1910 |
| % Color Removal | — | 92.6 | 60.9 |
| Color Removed per Gram of Carbon | — | 622 | 466 |

In this example, the anaerobic digestion step increased the color removal per gram of activated carbon adsorbent by 33 percent.

We claim:

1. A process for treatment of high strength BOD containing liquors, comprising the steps of:
    (a) mixing and contacting said liquors with biomass comprising viable facultative acid-forming bacteria and methanogenic bacteria, together with a powdered adsorbent support medium, for a period of 4–72 hours in a mildly mixed anaerobic digestion environment to remove a substantial portion of the BOD and generate a methane fuel gas and additional facultative acid-forming bacteria and methanogenic bacteria;
    (b) separating and recovering said methane fuel gas from said mixture of digested liquors, biomass and adsorbent support medium;
    (c) separating said biomass and adsorbent support medium from said digested liquors by gravitational force to form a clarified digested liquor and a sludge of said biomass and adsorbent support medium;
    (d) discharging said clarified digested liquor to the natural environment or to a further step of reuse or treatment;
    (e) continuously or intermittently recycling a portion or all of said sludge to said mixing and contact step (a) to treat additional quantities of high strength BOD containing liquor; and
    (f) intermittently or continuously adding fresh powdered adsorbent support medium to said mixture of liquors, biomass and support medium in step (a) to compensate for losses of said support medium in the process.

2. The process according to claim 1, wherein at least 25 percent of said powdered adsorbent support medium comprises particles of 0.01–0.3 mm diameter.

3. The process according to claim 1, wherein at least 25 percent of said powdered adsorbent support medium comprises particles of 0.01–0.2 mm diameter.

4. The process according to claim 1, wherein said powdered adsorbent support medium comprises one or more of fly ash, fuller's earth, diatomaceous earth, polymeric material, charcoal or activated carbon.

5. The process according to claim 1, wherein said mixture of liquors, biomass and powdered adsorbent support medium in step (a) contains 0.1 to about 20 g/l of said support medium.

6. The process according to claim 1, wherein said high strength liquors contain 500 to 100,000 mg/l Biochemical Oxygen Demand (BOD).

7. The process according to claim 1, wherein said high strength liquors contain 700 to 160,000 mg/l Chemical Oxygen Demand (COD).

8. The process according to claim 1, wherein said high strength liquors are mixed and contacted with said biomass and support medium in step (a) for 4–48 hours.

9. The process according to claim 1, wherein said high strength liquors are mixed and contacted with said biomass and support medium in step (a) at a loading rate of 0.1–4.5 kg Biochemical Oxygen Demand (BOD) per kg biomass per day.

10. The process according to claim 1, wherein said high strength liquors are mixed and contacted with said biomass and support medium in step (a) at a loading rate of 0.1–11.0 kg. Chemical Oxygen Demand (COD) per kg. biomass per day.

11. The process according to claim 1, wherein said high strength BOD containing liquors are generated from a heated process such as thermal conditioning or wet oxidation of sewage sludge or industrial waste.

12. The process according to claim 1, wherein said portion of soluble BOD removed in step (a) exceeds 50 percent.

13. The process according to claim 1, wherein said portion of soluble BOD removed in step (a) exceeds 80 percent.

14. The process according to claim 1, wherein said portion of soluble BOD removed in step (a) exceeds 90 percent.

15. The process according to claim 1, wherein said process is operated in a continuous or semi-continuous manner.

16. The process according to claim 1, further comprising the step of directing said separated mixture of biomass and adsorbent support medium in step (c) to a regeneration process wherein said biomass is destroyed and adsorbent support medium is regenerated, and returning said regenerated adsorbent support medium to said mixing and contact step (a) to treat additional quantities of high strength BOD-containing liquors.

17. The process according to claim 16, wherein said regeneration process comprises wet oxidation.

18. The process according to claim 16, wherein said regeneration process comprises controlled atmosphere combustion in a furnace.

19. The process according to claim 1, comprising the further steps of:
- (g) contacting saidf clarified digested liquor from step (d) with a color adsorbent to remove color therefrom;
- (h) separating spent color adsorbent from decolorized clarified liquor; and
- (i) discharging decolorized clarified liquor from step (h) to the natural environment or to a further step of reuse or treatment.

20. The process according to claim 19, wherein said contacting step (g) comprises mixing and contacting said clarified digested liquor from step (d) with 0.1 to 20 g/l of said color adsorbent for a period of 0.2 to 4 hours.

21. The process according to claim 19, wherein said color adsorbent comprises one or more of fly ash, fuller's earth, diatomaceous earth, polymeric material, charcoal or activated carbon.

22. The process according to claim 19, wherein at least 25 percent of said color adsorbent is a powder comprising particles of 0.01–0.3 mm diameter.

23. The process according to claim 19, comprising the further step of adding a portion or all of said spent color adsorbent from step (h) to said mixing and contact step (a) to treat additional quantities of high strength BOD containing liquors.

24. The process according to claim 19, comprising the further step of directing all or part of said spent color adsorbent from step (h) to a regeneration process wherein spent color adsorbent is regenerated, and returning regenerated color adsorbent to contact step (g) to remove color from additional quantities of clarified digested liquors.

25. The process according to claim 19, comprising the further step of directing all or part of said spent color adsorbent from step (h) to a regeneration process wherein spent color adsorbent is regenerated, and returning all or part of regenerated color adsorbent to said mixing and contact step (a) to treat additional quantities of high strength BOD containing liquors.

26. A process for treating high strength BOD containing colored liquors, comprising the steps of:
- (a) mixing and contacting said liquors with biomass comprising viable facultative acid-forming bacteria and methanogenic bacteria, together with powdered activated carbon as an adsorbent support medium, for a period of 4–72 hours in a mildly mixed anaerobic digestion environment to remove a substantial portion of the BOD and generate a methane fuel gas and additional facultative acid-forming bacteria and methanogenic bacteria;
- (b) separating and recovering said fuel gas from said mixture of digested liquors, biomass and powdered activated carbon;
- (c) separating said biomass and powdered activated carbon from said digested liquors to form a clarified digested liquor and a sludge of said biomass and said powdered activated carbon;
- (d) continuously or intermittently recycling a portion of said sludge to said mixing and contact step (a), to treat additional quantities of high strength BOD containing colored liquors;
- (e) contacting said clarified digested liquor from step (c) with additional portions of powdered activated carbon to decolorize said clarified digested liquor by adsorbing color therefrom and forming spent color adsorbent;
- (f) separating said spent color adsorbent from said decolorized clarified liquor in a second clarification step;
- (g) discharging decolorized clarified liquor following said second clarification step to the natural environment or to a further step of reuse or treatment;
- (h) passing a portion of said sludge from clarification step (c) to a regeneration step wherein biomass is destroyed and said powdered activated carbon in said sludge is regenerated;
- (i) recycling said regenerated powdered activated carbon to said anaerobic mixing and contact step (a) for treating additional quantities of high strength BOD containing colored liquors;
- (j) passing at least a part of said spent color adsorbent separated from decolorized clarified liquor in step (f) to a second regeneration step to destroy said adsorbed color and regenerate said powdered activated carbon; and
- (k) recycling a portion of regenerated powdered activated carbon color adsorbent from said second regeneration step to decolorization step (e) wherein additional portions of clarified digested liquor are decolorized by added fresh powdered activated carbon and regenerated powdered activated carbon color adsorbent from said second regeneration step.

27. The process according to claim 26, wherein said steps of regeneration comprise a thermal treatment of wet oxidation or controlled atmosphere furnace combustion.

28. The process according to claim 26, wherein at least 25 percent of said powdered activated carbon used as said support medium and color adsorbent comprises particles of 0.01–0.3 mm diameter.

29. The process according to claim 26, wherein at least 25 percent of said powdered carbon used as said support medium and color adsorbent comprises particles of 0.01–0.2 mm diameter.

30. The process according to claim 26, wherein said mixture of liquors, biomass and powdered activated carbon in step (a) contains 0.1 to 20 g/l of said powdered activated carbon.

31. The process according to claim 26, wherein said high strength liquors contain 500 to 100,000 mg/l Biochemical Oxygen Demand (BOD).

32. The process according to claim 26, wherein said high strength liquors are mixed and contacted with said biomass and powdered activated carbon in step (a) for 4–48 hours.

33. The process according to claim 26, wherein said high strength liquors are mixed and contacted with said biomass and powdered activated carbon in step (a) at a loading rate of 0.1–4.5 kg Biochemical Oxygen Demand (BOD) per kg biomass per day.

34. The process according to claim 26, wherein said high strength BOD containing liquors are generated from a heated process such as thermal conditioning or wet oxidation of sewage sludge or industrial waste.

35. The process according to claim 26, wherein said portion of soluble BOD removed in step (a) exceeds 50 percent.

36. The process according to claim 26, wherein said portion of soluble BOD removed in step (a) exceeds 80 percent.

37. The process according to claim 26, wherein said portion of soluble BOD removed in step (a) exceeds 90 percent.

38. The process according to claim 26, wherein said process is operated in a continuous or semi-continuous manner.

39. A process for treating high strength BOD containing colored liquors, comprising the steps of:
(a) mixing and contacting said liquors with biomass comprising viable facultative acid-forming bacteria and methanogenic bacteria, together with powdered activated carbon support medium, for a period of 4–72 hours in a mildly mixed anaerobic digestion environment to remove a substantial portion of the BOD and generate a methane fuel gas and additional facultative acid-forming bacteria and methanogenic bacteria;
(b) separating and recovering said fuel gas from said mixture of digested liquors, biomass and powdered activated carbon;
(c) separating said biomass and powdered activated carbon from said digested liquors to form a clarified liquor and a sludge of said biomass and said powdered activated carbon;
(d) continuously or intermittently recycling a portion of said sludge to said mixing and contact step (a), to treat additional quantities of high strength BOD containing colored liquors;
(e) contacting said clarified digested liquor from step (c) with additional portions of powdered activated carbon to decolorize said clarified digested liquor by adsorbing color therefrom and forming spent color adsorbent;
(f) separating said spent color adsorbent from said decolorized clarified liquor in a second clarification step;
(g) discharging decolorized clarified liquor following said second clarification step to the natural environment or to a further step of reuse or treatment;
(h) passing a portion of said sludge from clarification step (c) to a regeneration step wherein biomass is destroyed and said powdered activated carbon in said sludge is regenerated;
(i) passing at least a part of said spent color adsorbent separated from decolorized clarified liquor in step (f) to said regeneration of step (h) to destroy said adsorbed color and regenerate said powdered activated carbon color adsorbent; and
(j) recycling at least a portion of said regenerated activated carbon from step (i) to said anaerobic mixing and contact step (a) for treating additional quantities of high strength BOD containing colored liquors.

40. The process according to claim 39, comprising the further step of recycling a portion of said regenerated powdered activated carbon from step (i) to said decolorization step (e) wherein additional portions of clarified liquor are decolorized by added fresh powdered activated carbon and said regenerated carbon.

41. The process according to claim 39, comprising the further step of washing with clean water a portion of said regenerated powdered activated carbon to remove color therefrom, and recycling washed carbon to said decolorization step (e) wherein additional portions of clarified liquor are decolorized by added fresh powdered activated carbon and said washed regenerated activated carbon.

42. The process according to claim 41, wherein color containing wash water from said step of washing regenerated powdered activated carbon is returned to said anaerobic mixing and contact step (a) for treatment to increase adsorbability of color contained therein.

43. The process according to claim 41, wherein said regeneration step comprises a thermal treatment step of wet oxidation or furnace combustion.

44. The process according to claim 41, wherein at least 25 percent of said powdered activated carbon comprises particles of 0.01–0.3 mm diameter.

45. The process according to claim 41, wherein at least 25 percent of said powdered activated carbon comprises particles of 0.01–0.2 mm diameter.

46. The process according to claim 41, wherein said mixture of liquors, biomass and powdered activated carbon in step (a) contains 0.1 to about 20 g/l of said powdered activated carbon.

47. The process according to claim 41, wherein said high strength liquors contain 500 to 100,000 mg/l Biochemical Oxygen Demand (BOD).

48. The process according to claim 39, wherein said high strength liquors are mixed and contacted with said biomass and powdered activated carbon in step (a) for 4–48 hours.

49. The process according to claim 39, wherein said high strength liquors are mixed and contacted with said biomass and powdered activated carbon in step (a) at a loading rate of 0.1–4.5 kg Biochemical Oxygen Demand (BOD) per kg biomass per day.

50. The process according to claim 39, wherein said high strength BOD containing liquors are generated from a heated process such as thermal conditioning or wet oxidation of sewage sludge or industrial waste.

51. The process according to claim 39, wherein said portion of soluble BOD removed in step (a) exceeds 50 percent.

52. The process according to claim 39, wherein said portion of soluble BOD removed in step (a) exceeds 80 percent.

53. The process according to claim 39, wherein said portion of soluble BOD removed in step (a) exceeds 90 percent.

54. The process according to claim 39, wherein the fraction of color removed in step (e) exceeds 50 percent.

55. The process according to claim 39, wherein the fraction of color removed in step (e) exceeds 80 percent.

56. The process according to claim 39, wherein the fraction of color removed in step (e) exceeds 90 percent.

57. The process according to claim 39, wherein said process is operated in a continuous or semi-continuous manner.

58. A process for treating high strength BOD containing colored liquors, comprising the steps of:
(a) mixing and contacting said liquors with biomass comprising viable facultative acid-forming bacteria and methanogenic bacteria, together with powdered activated carbon support medium, for a period of 4–72 hours in a mildly mixed anaerobic digestion environment to remove a substantial portion of the BOD and generate a methane fuel gas and additional facultative acid-forming bacteria and methanogenic bacteria;

(b) separating and recovering said fuel gas from said mixture of digested liquors, biomass and powdered activated carbon;

(c) separating said biomass and powdered activated carbon from said digested liquors to form a clarified liquor and a sludge of said biomass and said powdered activated carbon;

(d) continuously or intermittently recycling a portion of said sludge to said mixing and contact step (a), to treat additional quantities of high strength BOD containing colored liquors;

(e) contacting said clarified digested liquor from step (c) with additional portions of powdered activated carbon to decolorize said clarified digested liquor by adsorbing color therefrom and forming spent color adsorbent;

(f) separating said spent color adsorbent from said decolorized clarified liquor in a second clarification step;

(g) discharging decolorized clarified liquor following said second clarification step to the natural environment or to a further step of reuse or treatment;

(h) adding a portion or all of said spent color adsorbent from step (f) to said mixing and contact step (a) to treat additional quantities of high strength BOD containing colored liquors.

* * * * *

UNITED STATES PATENT AND TRADEMARK OFFICE
CERTIFICATE OF CORRECTION

PATENT NO. : 4,626,354

DATED : Dec. 2, 1986

INVENTOR(S) : Hoffman et al.

It is certified that error appears in the above-identified patent and that said Letters Patent is hereby corrected as shown below:

Column 9, line 2, "20 of all" should read --20 or all--.

Column 12, line 57, "activatec" should read --activated--.

Column 15, line 13, Claim 19, "saidf" should read --said--.

Column 16, line 46, Claim 29, insert --activated-- before "carbon".

Signed and Sealed this

Seventeenth Day of February, 1987

Attest:

DONALD J. QUIGG

Attesting Officer

Commissioner of Patents and Trademarks